UNITED STATES PATENT OFFICE.

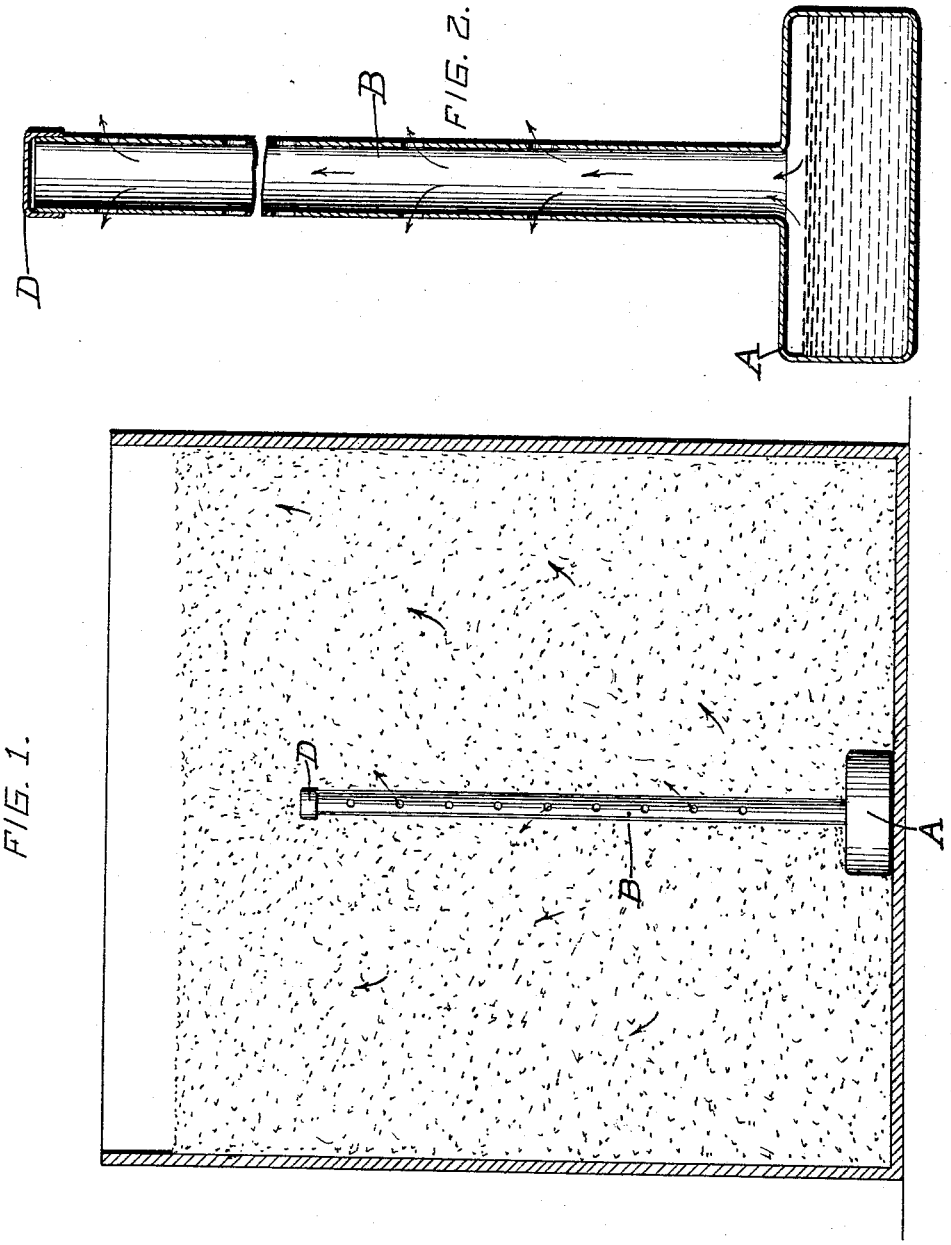

ROBERT WORN GEESLIN, OF CARADAN, TEXAS.

APPARATUS FOR DESTROYING INSECTS.

1,219,096.   Specification of Letters Patent.   Patented Mar. 13, 1917.

Application filed December 2, 1916. Serial No. 134,761.

*To all whom it may concern:*

Be it known that I, ROBERT W. GEESLIN, a citizen of the United States, residing at Caradan, in the county of Mills and State of Texas, have invented certain new and useful Improvements in Apparatus for Destroying Insects; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for exterminating insects and especially corn weevils and consists essentially in the provision of a receptacle adapted to be placed in a bin containing grain and adapted to contain a fumigant and provided with an upright shaft with openings at intervals through which the destructive fumes may make exit.

The invention consists further in the provision of various details of construction, combinations and arrangements of parts which will be hereinafter fully described, shown in the accompanying drawings and then specifically defined in the appended claim.

My invention is illustrated in the accompanying drawings, in which:—

Figure 1 is a central vertical sectional view showing my device as applied to a grain bin.

Fig. 2 is a transverse sectional view through the receptacle.

Reference now being had to the details of the drawings by letter, A designates a receptacle which may be of any size or shape and adapted to contain a fumigant. Rising from the top is a shaft B having series of apertures arranged in alternate relation to one another and through which the fumes are adapted to make exit into the bin, the various holes being provided for the purpose of allowing the device to be placed in bins of varying quantities of grain. The top of the shaft is closed by a stopper D, thus making it necessary for all fumes to make exit in different directions through the apertures in the shaft.

I have found that, by the provision of a device embodying the features of my invention, insects of various kinds and especially corn weevils may be effectually exterminated by inhaling the fumes of the fumigant.

What I claim to be new is:—

A fumigating apparatus consisting of a closed bulb having a flat bottom adapted to contain a fumigant, a perforated tube attached to said bulb and closed by a cap.

In testimony whereof I hereunto affix my signature in presence of three witnesses.

ROBERT WORN GEESLIN.

Witnesses:
  E. M. WILSON,
  W. A. RICHARDS,
  M. G. CLINE.

Copies of this patent may be obtained for five cents each, by addressing the "Commissioner of Patents, Washington, D. C."